(12) United States Patent
Tane

(10) Patent No.: US 7,357,096 B2
(45) Date of Patent: Apr. 15, 2008

(54) METER PANEL FOR USE IN AUTOMOTIVE INSTRUMENT

(75) Inventor: Seigo Tane, Kariya (JP)

(73) Assignee: Denso Corporation (JP)

(*) Notice: Subject to any disclaimer, the term of this patent is extended or adjusted under 35 U.S.C. 154(b) by 0 days.

(21) Appl. No.: 11/352,291

(22) Filed: Feb. 13, 2006

(65) Prior Publication Data
US 2006/0185576 A1 Aug. 24, 2006

(30) Foreign Application Priority Data
Feb. 24, 2005 (JP) ............................ 2005-048795
Sep. 28, 2005 (JP) ............................ 2005-281358

(51) Int. Cl.
*G12B 11/04* (2006.01)
*G01D 11/28* (2006.01)

(52) U.S. Cl. ................ 116/288; 116/62.1; 116/DIG. 6; 362/26

(58) Field of Classification Search ................ 116/286, 116/287, 288, 332, 62.1, 62.4, DIG. 5, DIG. 6; 362/26, 27, 30; 368/233, 234
See application file for complete search history.

(56) References Cited

U.S. PATENT DOCUMENTS

| 2,009,209 | A | * | 7/1935 | Scantlebury | 362/26 |
|---|---|---|---|---|---|
| 2,280,700 | A | * | 4/1942 | Hall | 116/332 |
| 2,502,985 | A | * | 4/1950 | Paulson | 368/79 |
| 2,831,453 | A | * | 4/1958 | Hardesty | 116/288 |
| 3,641,967 | A | * | 2/1972 | Charbonneaux | 116/288 |
| 5,201,277 | A | * | 4/1993 | Aoki et al. | 116/286 |
| 5,272,463 | A | * | 12/1993 | Furuya et al. | 340/438 |
| 5,284,108 | A | * | 2/1994 | Furuya | 116/286 |
| 5,414,595 | A | * | 5/1995 | Oike et al. | 362/489 |
| 5,529,014 | A | | 6/1996 | Ohta et al. | 116/286 |
| 5,556,187 | A | * | 9/1996 | Furuya et al. | 362/27 |
| 5,703,612 | A | * | 12/1997 | Salmon et al. | 340/815.78 |
| 5,999,685 | A | * | 12/1999 | Goto et al. | 385/146 |
| 6,025,820 | A | * | 2/2000 | Salmon et al. | 345/75.1 |
| 6,152,066 | A | * | 11/2000 | Knoll et al. | 116/288 |
| 6,441,726 | B1 | * | 8/2002 | Voto et al. | 340/438 |
| 7,129,849 | B2 | * | 10/2006 | Dinh et al. | 340/688 |

FOREIGN PATENT DOCUMENTS

| JP | 06018295 A | * | 1/1994 |
|---|---|---|---|
| JP | 08178708 A | * | 7/1996 |
| JP | 10160522 A | * | 6/1998 |

* cited by examiner

*Primary Examiner*—R. Alexander Smith
(74) *Attorney, Agent, or Firm*—Nixon & Vanderhye PC

(57) ABSTRACT

A meter panel such as a speedometer used in an instrument panel of an automotive vehicle includes a transparent pointer disc, a dial plate having scales and numerals thereon, and a light source for illuminating the pointer disc. The pointer disc is disposed in front of the dial plate to overlap the scales and numerals of the dial plate. The pointer disc is rotated by a pointer driver disposed behind the dial plate. Light emitted from the light source is introduced into the transparent pointer disc and reflected by a groove formed on the pointer disc toward the front side of the meter panel, thereby making the pointer visible. Since the pointer overlaps the scales and numerals of the dial plate, the pointer position relative to the scales and numerals is easily and clearly recognized.

23 Claims, 17 Drawing Sheets

METER PANEL FOR USE IN AUTOMOTIVE INSTRUMENT

CROSS-REFERENCE TO RELATED APPLICATIONS

This application is based upon and claims benefit of priority of Japanese Patent Applications No. 2005-48795 filed on Feb. 24, 2005, and No. 2005-281358 filed on Sep. 28, 2005, the contents of which are incorporated herein by reference.

BACKGROUND OF THE INVENTION

1. Field of the Invention

The present invention relates to a meter panel having a transparent rotatable pointer disc, which is advantageously used in an instrument panel of an automotive vehicle.

2. Description of Related Art

An example of an analog meter having a rotatable pointer disc is disclosed in JP-B2-3012090. The rotatable pointer disc includes a slit for emitting light therethrough, and the pointer disc other than the slit is made non-transparent so that light emitted from the rear side of the pointer disc is intercepted. In this manner, the pointer slit functions as a visible pointer. The rotatable pointer disc is disposed in front of a dial plate having scales and numerals. The rotatable disc has to be disposed not to cover the scales and numerals on the dial plate. If the rotatable disc overlaps the scales and numerals on the dial plate, the scales and numerals become invisible because the rotatable disc is non-transparent at all portions other than the slit.

SUMMARY OF THE INVENTION

The present invention has been made in view of the above-mentioned problem, and an object of the present invention is to provide an improved meter panel, in which a rotatable pointer disc is disposed to overlap scales and numerals of a dial plate without blinding the scales and numerals.

The meter panel of the present invention is advantageously applicable to an instrument panel of an automotive vehicle. The meter panel includes a rotatable pointer disc made of a light-conductive transparent material, a dial plate having scales and numerals thereon, and a light source or sources for illuminating the pointer disc. The pointer disc is disposed in front of and in parallel to the dial plate to overlap the scales and numerals of the dial disc. The light source is positioned at a rear side of the pointer disc and emits light to a center portion of the pointer disc.

A groove such as a V-shaped groove is formed on the rear surface of the pointer disc. Light emitted from the light source is introduced into the transparent pointer disc and is reflected by the groove toward the front side of the meter panel (toward a user), thereby making a pointer portion visible. The pointer disc is rotated in front of the dial plate by a pointer driver located behind the dial plate. Thus, the pointer portion overlapping the scales and numerals of the dial plate indicates an amount to be shown on the meter panel such as a vehicle speed.

The meter panel structures can be variously modified. A concave circular groove may be used in place of the V-shaped groove. Surfaces of the V-shaped groove may be made rough to have small projections and depressions that scatter the light reflected by the groove. It is also possible to use only a rough surface in place of the groove. The light source may be positioned at an outer periphery of the pointer disc, and light introduced into the pointer disc may be reflected by a coating disposed at an inside portion of the pointer disc. An amount of light reflected by the groove toward the front side of the meter panel may be varied along the radial direction of the pointer portion. Preferably, the amount of reflected light is made larger at the radial outside than at the radial inside to further enhance visibility of the meter panel. The light source emitting two or more colored lights may be employed, and the light colors may be changed according to a vehicle speed, for example.

According to the present invention, the transparent pointer disc is disposed to overlap the scales and numerals of the dial plate. Therefore, the numerals and scales indicated by the pointer are easily and clearly recognized by a user. Other objects and features of the present invention will become more readily apparent from a better understanding of the preferred embodiment described below with reference to the following drawings.

DETAILED DESCRIPTION OF THE PREFERRED EMBODIMENT

A preferred embodiment of the present invention will be described with reference to accompanying drawings. Various examples (Example 1 to Example 14) are shown to better describe the embodiment of the present invention. In these examples, the present invention is applied to a speedometer used in an instrument panel of an automotive vehicle.

Figure 1:
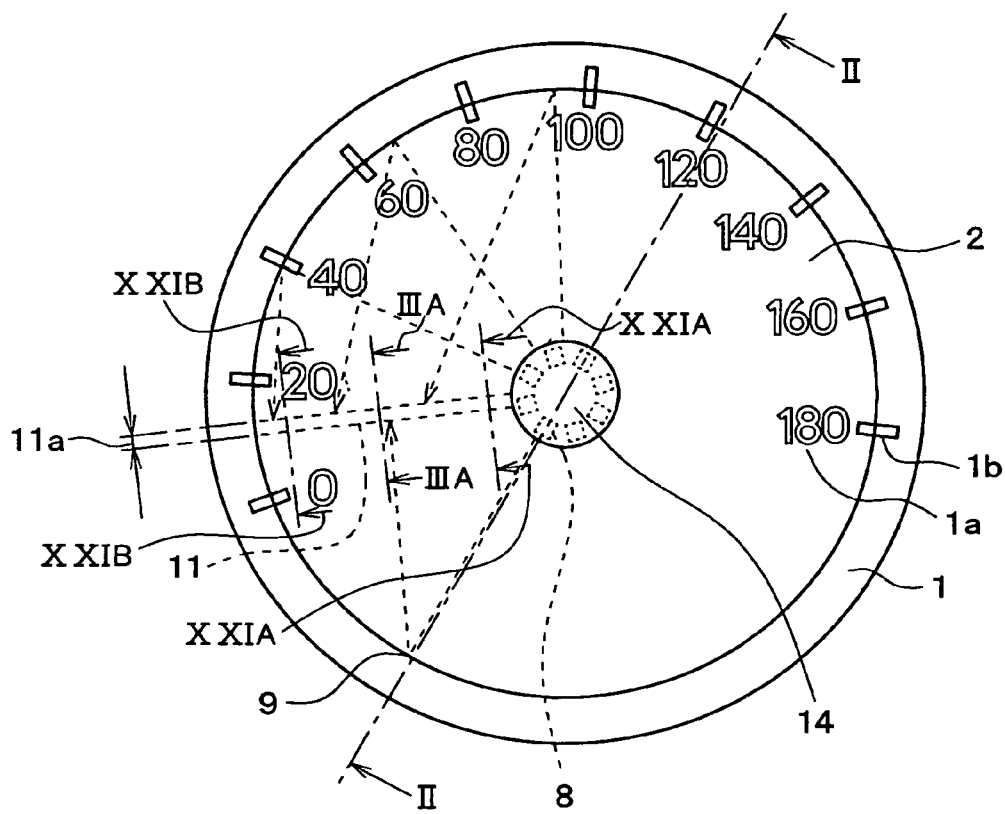
FIG. 1 is a front view showing a meter panel as Example 1 of the present invention.
Figure 2:
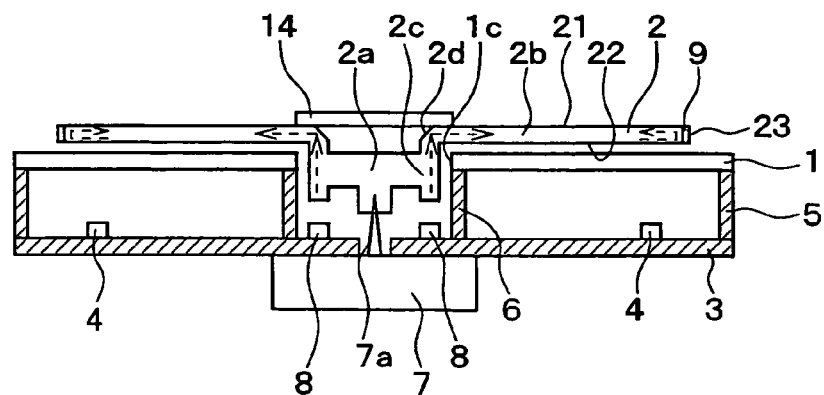
FIG. 2 is a cross-sectional view showing the meter panel, taken along line II-II shown in FIG. 1.

First, Example 1 will be described with reference to FIGS. 1-5. As shown in FIGS. 1 and 2, a meter panel of a speedometer includes a dial plate 1, a rotatable pointer disc 2 (hereinafter referred to as a pointer disc), and a pointer driver 7 for driving the pointer disc 2. The pointer disc 2 is disposed in parallel to and in front of the dial plate 1, so that both overlaps each other.

The dial plate 1 is a round disc having a center opening 1c. The dial plate 1 is made of a transparent material such as acrylic resin. As shown in FIG. 1, numerals 1a indicating speeds in km/h and scales 1b are shown on the dial disc 1. The numerals 1a and the scales 1b are made so that light is conducted therethrough (i.e., transparent), while other portions of the dial plate 1 are covered with a non-transparent colored layer such as a black ink layer so that light is intercepted. As shown in FIG. 2, behind the dial plate 1 (at a rear side of the dial plate 1), a base plate 3, on which light sources 4 for illuminating the dial plate are mounted, is positioned. The light from the light sources 4 is intercepted by intercepting plates 5, 6 standing upright on the base plate 3.

As shown in FIGS. 1 and 2, the pointer disc 2 is a substantially round disc having a front surface 21 facing a user (or a driver), a rear surface 22 and an outer periphery 23 that is perpendicular to the front and rear surfaces. The pointer disc 2 is made of a transparent material, such as acrylic resin or poly-carbonate resin. The pointer disc 2 is colorless transparent, or it may be transparently colored with black or grey. The transparent pointer disc 2 is overlapped in front of the dial plate 1 with a certain distance apart therefrom. The numerals 1a and scales 1b of the dial plate 1 are visible from the front side because the pointer plate 2 is transparent.

The pointer disc 2 is composed of a center portion 2a extending to the rear side and a disc portion 2b. The center portion is connected to a shaft 7a of a pointer driver 7, so that the pointer disc 2 is rotated by the pointer driver 7. The disc portion 2b is a thin plate (e.g., 1.5 mm thick). Light entering the disc portion 2b from its inside travels in the disc portion 2b between the front surface 21 and the rear surface 22. The light traveling in the disc portion 2b includes light in parallel to the front and rear surfaces 21, 22 and light reflected on the surfaces 21, 22.

The light sources 8 for illuminating the pointer disc 2 are positioned to face the center portion 2a extending through the center opening 1c of the dial plate 1. The light sources 8 are positioned on the base plate 3 and around the shaft 7a of the pointer driver 7. All the light sources 8 in this example emit light having the same color such as white. It is, however, possible to use other colors.

The center portion 2a of the pointer disc 2 includes a light conducting portion 2c facing the light sources 8 and a reflecting surface 2d. The light emitted from the light sources 8 is conducted through the light-conducting portion 2c and reflected by the reflecting surface 2d, and then conducted into the disc portion 2b of the pointer disc 2. Further, a coating 9 for reflecting light is formed in the disc portion 2b at a neighborhood of its outer periphery 23. The light reached the coating 9 is reflected on the coating 9 and conducted again into the disc portion 2b. The coating 9 is made of, for example, non-transparent white paint.

Figure 3A:
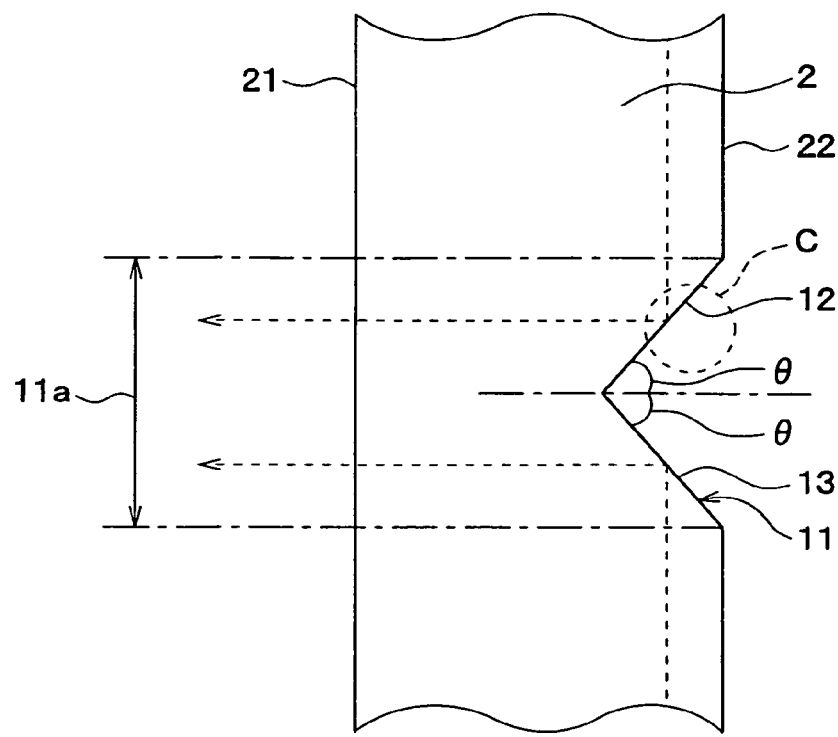
FIG. 3A is a cross-sectional view showing part of a transparent rotatable pointer disc in an enlarged scale, taken along line IIIA-IIIA shown in FIG. 1.

A groove 11 is formed on the rear surface 22 of the pointer disc 2. The groove 11 extends in the radial direction from the center portion 2a to the outer periphery 23, as shown in FIG. 1. As shown in FIG. 3A, the groove 11 is V-shaped, and its width 11a is 0.5-2.0 mm, for example. The groove 11 may be formed by machining or by other methods. The groove 11 has a pair of groove surfaces 12, 13. The groove surfaces 12, 13 make an angle θ with respect to a line perpendicular to the rear surface 22, so that the light entered the disc portion 2b is reflected toward the front side (toward a user) as shown with dotted lines in FIG. 3A. Preferably, the angle θ is set to 45° so that the light in the disc portion 2b is fully reflected toward the front side.

Figure 3B:
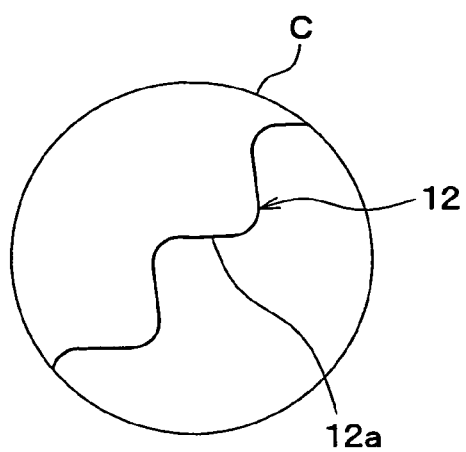
FIG. 3B is a cross-sectional view showing a portion C encircled in FIG. 3A.

As shown in FIG. 3B, which shows the groove surface 12 in an enlarged scale, the groove surfaces 12, 13 are processed to be a rough surface 12a having small projections and depressions. In this manner, light traveling in the disc portion 2b in the direction not parallel to the surfaces 21, 22 is also reflected by the groove surfaces 12, 13 toward the front side. The groove 11 and the coating 9 formed in the disc portion 2b are referred to as a first reflecting means and a second reflecting means, respectively.

As described above, the light entered into the disc portion 2b and reached the coating 9 is reflected thereon, and the reflected light again travels in the disc portion 2b. The light traveling in the disc portion 2b in the various directions is reflected toward the front side by the groove surfaces 12, 13.

In this manner, the pointer portion 15 (refer to FIG. 5) becomes visible from the front side of the meter panel. A coating (not shown) for preventing reflection of light incident upon the front surface 21 of the pointer disc 2 is formed on the front surface 21 to improve visibility of the meter panel.

The front side of the center portion 2a of the pointer disc 2 is covered with a covering boss 14 that reflects light emitted from the light sources 8. The covering boss 14 prevents the light emitted from the light sources 8 from directly entering into eyes of the user. Further, the light reflected by the covering boss 14 illuminates the front surface of the dial plate 1 to show a light pattern thereon. For example, when the dial disc 1 (other than the numerals 1a and the scales 1b) is made black, and red light is emitted from the light sources 8, a gradation pattern in red in the radial direction will be made on the front surface of the dial plate 1. The covering boss 14 may be made of polycarbonate resin and coated with non-transparent white paint. Alternatively, the covering boss 14 may be made of ABS resin reflecting light.

Figure 4:
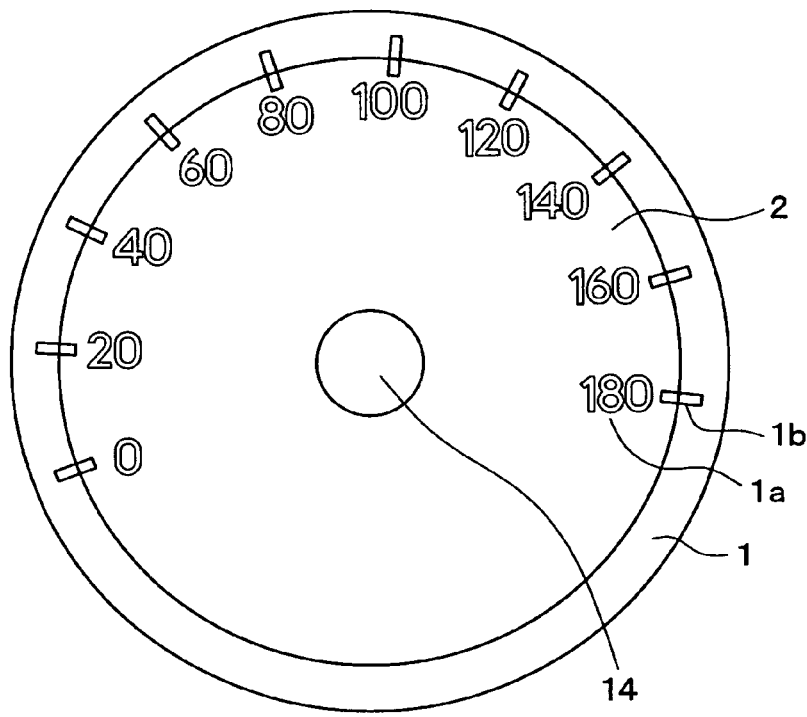
FIG. 4 is a front view showing the meter panel, in which the rotatable pointer disc is not illuminated.
Figure 5:
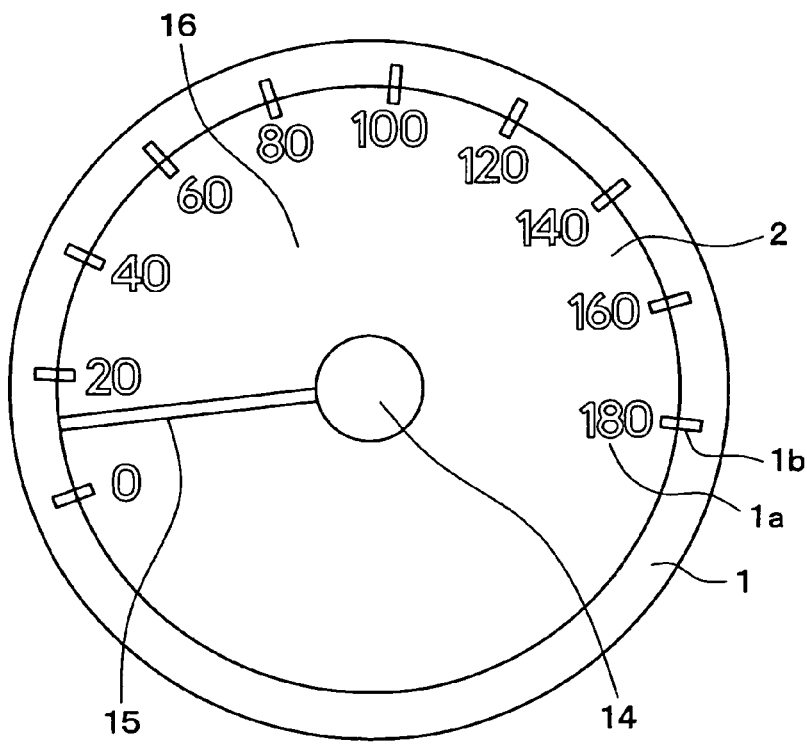
FIG. 5 is a front view showing the meter panel, in which the rotatable pointer disc is illuminated.

When the light sources 8 are not lit, the pointer portion 15 of the pointer disc 2 is not visible from the front side of the meter panel because the pointer disc 2 is transparent, as shown in FIG. 4. When the light sources 8 are lit, the pointer portion 15 is visible from the front side, as shown in FIG. 5, because the light traveling in the disc portion 2b in various directions is not reflected to the front side except at the groove 11. In other words, the light is reflected only at the groove 11 toward the front side, and the pointer portion 15 formed by the groove 11 is visible. Since the pointer disc 2 having the visible pointer portion 15 is rotated in front of the dial plate 1 by the pointer driver 7, a driving speed of a vehicle is shown on the meter panel. The numerals 1a and the scales 1b on the dial plate 1 are visible through the transparent pointer disc 2. Since the width 11a and the shape of the groove 11 are uniform in its entire length in this example, the pointer portion 15 is seen in a uniform shape and brightness. The pointer portion 15 is in the same color as the color of the light sources 8.

Advantageous features of Example 1 described above will be summarized below. (1) Since the pointer disc 2 is made of a light-conducting transparent material, it can be overlapped in front of the dial plate 1 without blinding the numerals 1a and scales 1b of the dial plate. Since groove 11 formed on the rear surface 22 of the pointer disc 2 reflects light introduced in the disc portion 2b of the pointer disc 2 toward the front side, the pointer portion 15 is visible from the front side. (2) Since the groove 11 formed on the pointer disc 2 is transparent, the pointer portion 15 is not visible when the light sources 8 are not lit. When the light sources 8 are lit, the pointer portion 15 suddenly becomes visible, enhancing ornamental effects. As opposed to this, the pointer is visible in a conventional meter even when the light source is not lit because the pointer portion is made by forming a slit on the pointer disc. (3) The width of the pointer portion 15 can be arbitrarily set by selecting the width 11a of the groove 11. The width of the pointer portion 15 can be made considerably small if desired for ornamental reasons. (4) Since the groove 11 is formed on the rear surface 22 of the pointer disc 2 which is positioned close to the front surface of the dial plate 1, the pointer portion 15 is seen as if it closely contacted the dial plate 2. (5) Since the coating 9 for reflecting light is provided in the vicinity of the outer periphery 23 of the pointer disc 2, the light reached to the coating 9 can be led again into the disc portion 2b of the pointer disc 2, the light emitted from all of the light sources 8 can be effectively utilized. It is possible to eliminate the coating 9. In this case, however, the light sources 8 located far from the groove 11 (an opposite side of the groove in the radial direction) are not effectively utilized to illuminate the pointer portion 15. (6) Since the pointer disc 2 is made of a light-conducting transparent material, the light sources 8 can be positioned to face only the center portion 2a of the pointer disc 2. As opposed to this, the light sources in a conventional meter have to illuminate an entire area of the pointer disc because the pointer portion rotates. Therefore, a larger light source or a larger number of light sources are required in the conventional meter panel.

Figure 6:
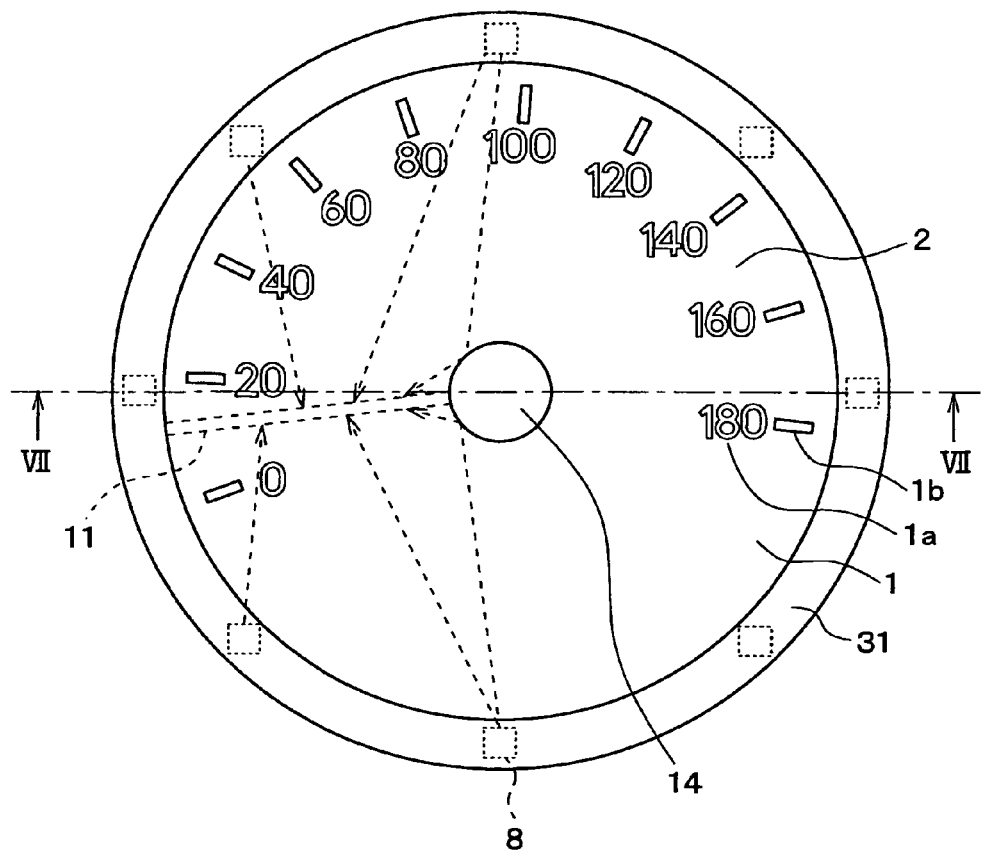
FIG. 6 is a front view showing a meter panel as Example 2 of the present invention.
Figure 7:
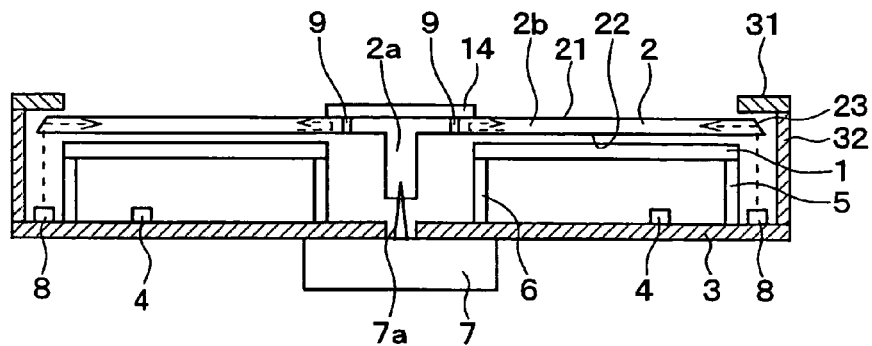
FIG. 7 is a cross-sectional view showing the meter panel, taken along line VII-VII shown in FIG. 6.
Figure 8:
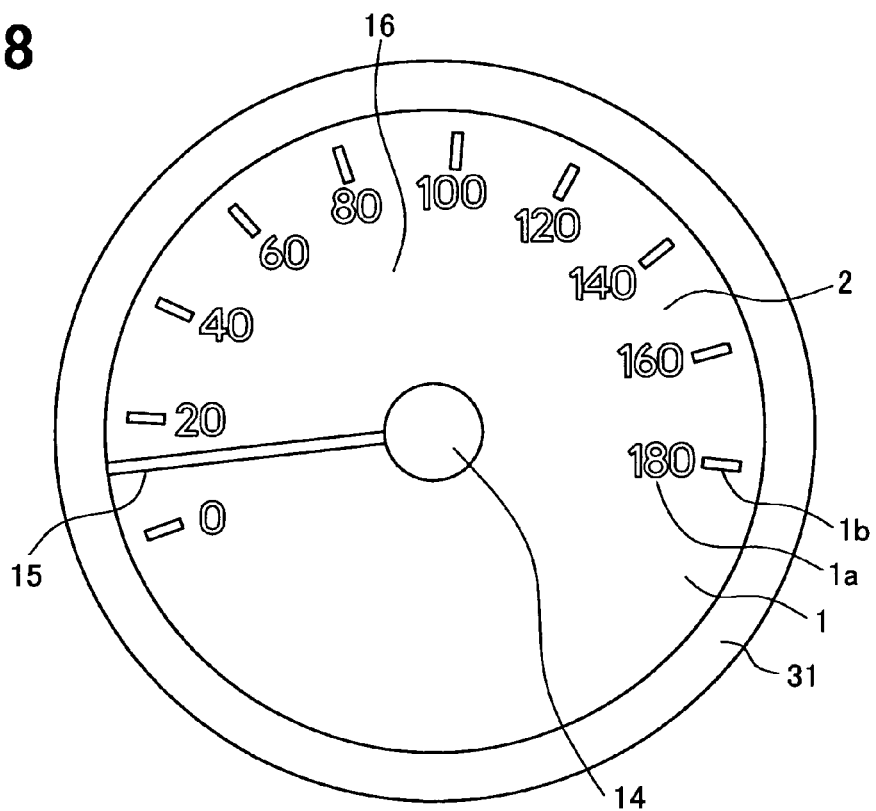
FIG. 8 is a front view showing the meter panel as Example 2, in which the rotatable pointer disc is illuminated.

Example 2 of the present invention will be described with reference to FIGS. 6-8. In this example, the light sources 8 for illuminating the pointer disc 2 are positioned to face the outer periphery 23. The outer periphery 23 is slanted to form a surface reflecting light emitted from the light sources toward the disc portion 2b. An intercepting wall 32 that prevents light from being emitted in the radial outside and a mask 31 that prevents light from being emitted to the front side are provided. A coating 9 reflecting light is positioned underneath the covering boss 14. Other structures of this Example 2 are the same as those of Example 1. Parts and components that are the same as or similar to those of Example 1 carry the same reference numbers.

Light emitted from the light sources 8 is reflected by the slanted outer periphery 23 of the pointer disc 2 and led to the disc portion 2b. The light reached the coating 9 is reflected and led again into the disc portion 2b. The light thus traveling in the disc portion 2b is reflected toward the front side, thereby making the pointer portion 15 visible from the front side, as shown in FIG. 8. Advantages similar to those in Example 1 are attained in this example, too.

Figure 9:
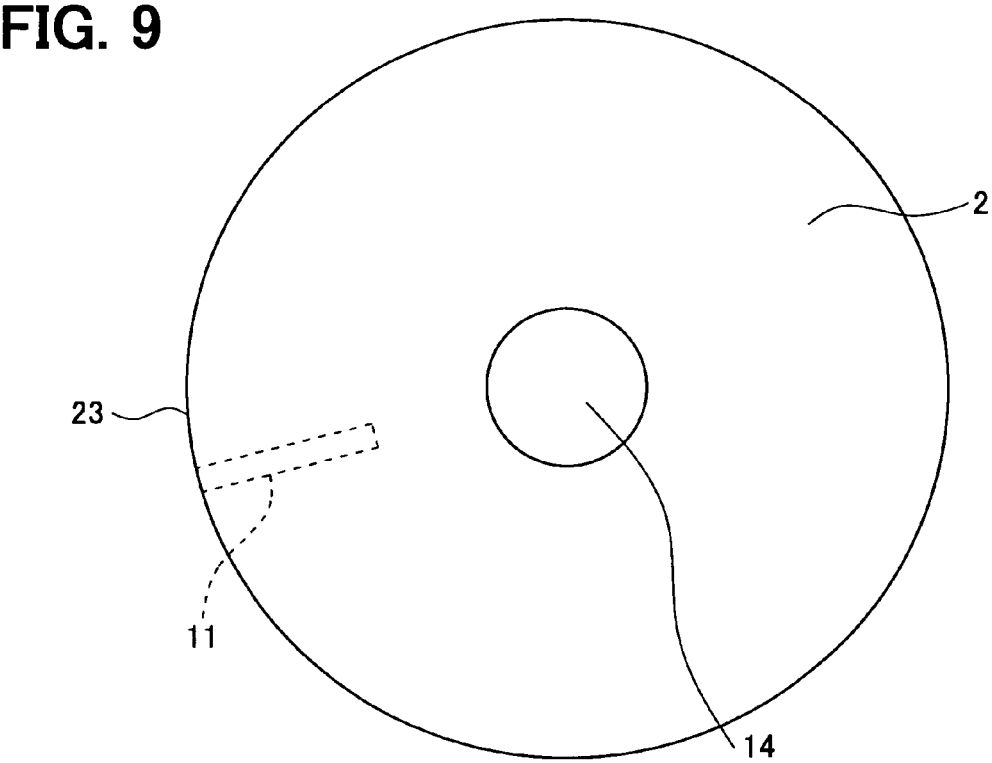
FIG. 9 is a front view showing a rotatable pointer disc as Example 3-1 of the present invention.
Figure 10:
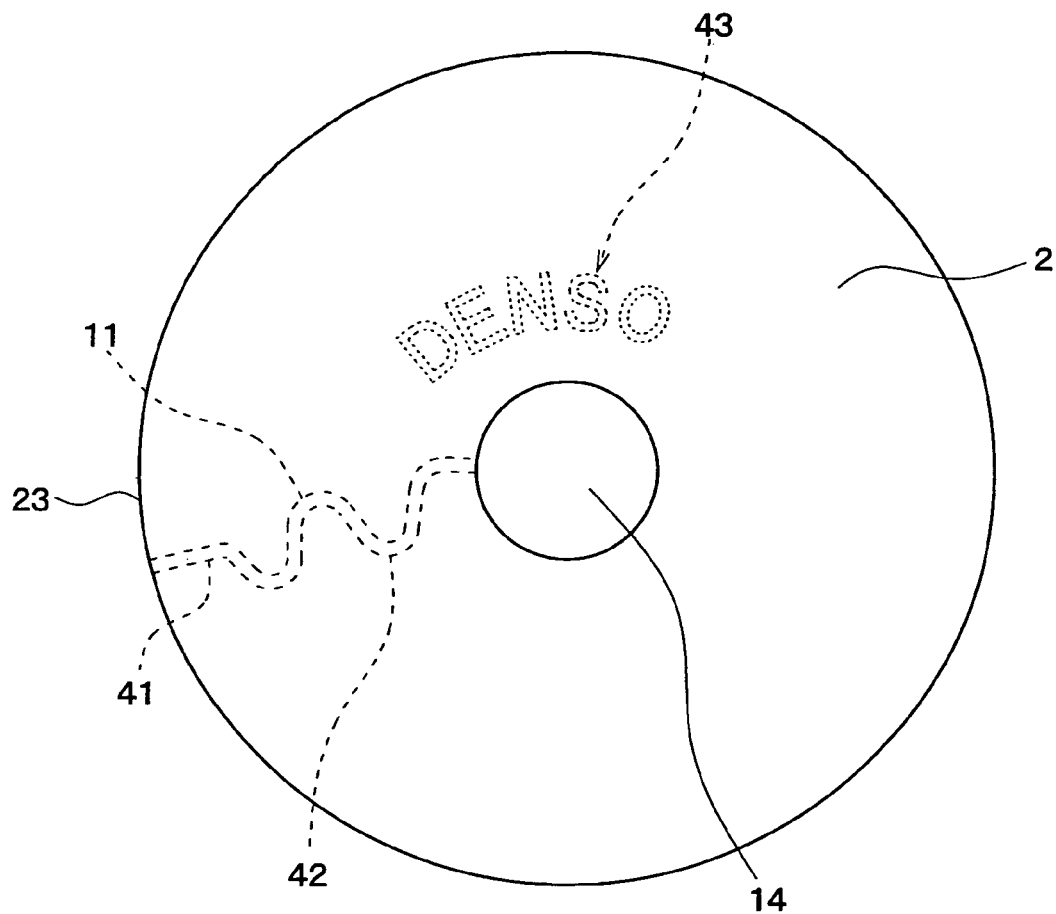
FIG. 10 is a front view showing a rotatable pointer disc as Example 3-2 of the present invention.

Example 3-1 is shown in FIG. 9. In this example, the groove 11 is made shorter than that of Example 1. That is, the groove 11 extends from the outer periphery 23 of the pointer disc 2 to a half way to the covering boss 14. Other structures are the same as those of Example 1. Example 3-2 is shown in FIG. 10. In this example, the shape of the groove 11 are modified. The groove 11 of this Example is composed of a straight portion 41 positioned close to the outer periphery 23 and a serpentine portion 42. In addition, grooves 43 showing an ornamental design such as a logo mark are also formed on the rear surface 22 of the pointer disc 2. Other structures are the same as those of Example 1.

Figure 11:
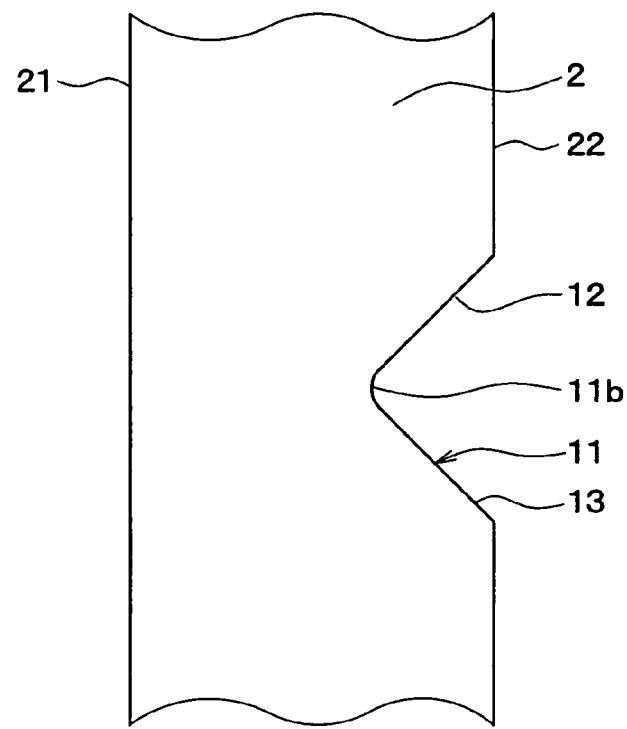
FIG. 11 is a cross-sectional view showing part of the rotatable pointer disc as Example 4 of the present invention.

Example 4 is shown in FIG. 11. In this example, the bottom 11b of the V-shaped groove 11 is rounded. If the projections and depressions formed on the groove surfaces 12, 13 are not large enough, and the bottom angle is sharp, a line becomes visible along the bottom 11b of the groove 11 when the pointer disc 2 is illuminated. It is preferable to make the bottom angle round to avoid this phenomenon.

Figure 12:
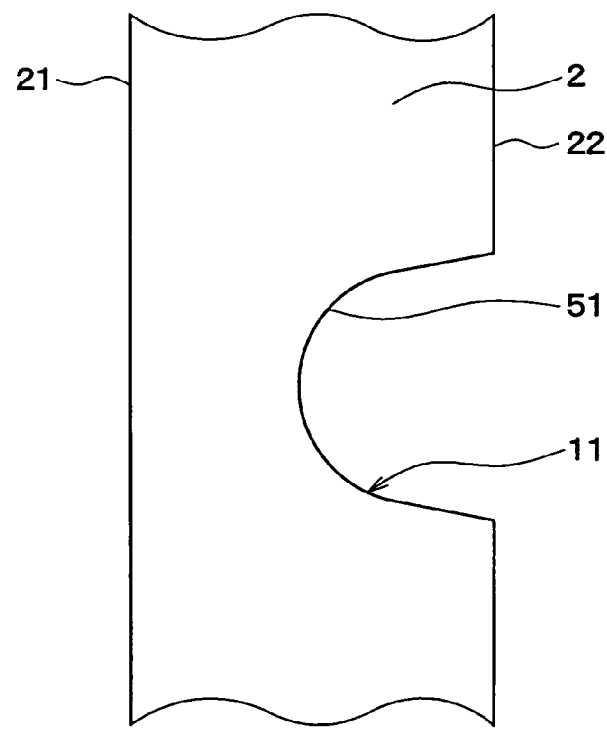
FIG. 12 is a cross-sectional view showing part of the rotatable pointer disc as Example 5 of the present invention.

Example 5 is shown in FIG. 12. In this example, the groove 11 is formed to have a concave circular surface 51. The shape of the groove 11 can be modified to shapes other than the V-shape as long as the light traveling through the disc portion 2b of the pointer disc 2 is reflected toward the front side. It is preferable to make the concave circular surface 51 a rough surface having small projections and depressions.

Figure 13:
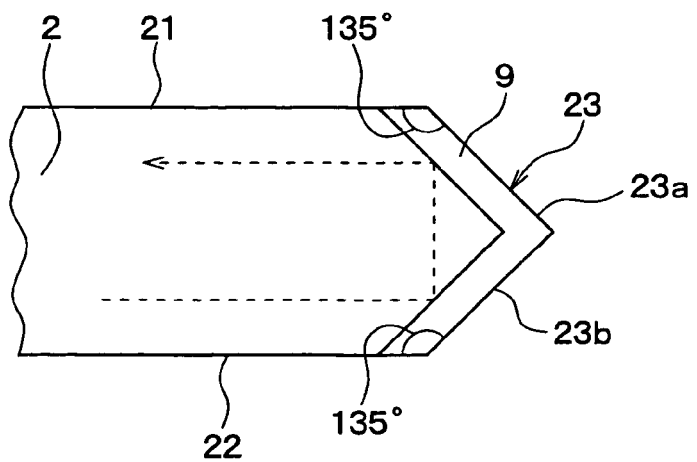
FIG. 13 is a cross-sectional view showing part of the rotatable pointer disc as Example 6 of the present invention.

Example 6 is shown in FIG. 13. In this example, the outer periphery 23 of the pointer disc 2 is modified to have two slanted surfaces 23a, 23b. The coating 9 for reflecting light is disposed on both slanted surfaces 23a, 23b. An angle made between the front surface 21 and the slanted surface 23a and an angle made between the slanted surface 23b and the rear surface 22 are set to 135°, thereby making an angle of 90° between both slanted surfaces 23a, 23b. The light traveling in the disc portion 2b is reflected by the slanted surfaces 23a, 23b as shown with a dotted line in FIG. 13.

Figure 14:
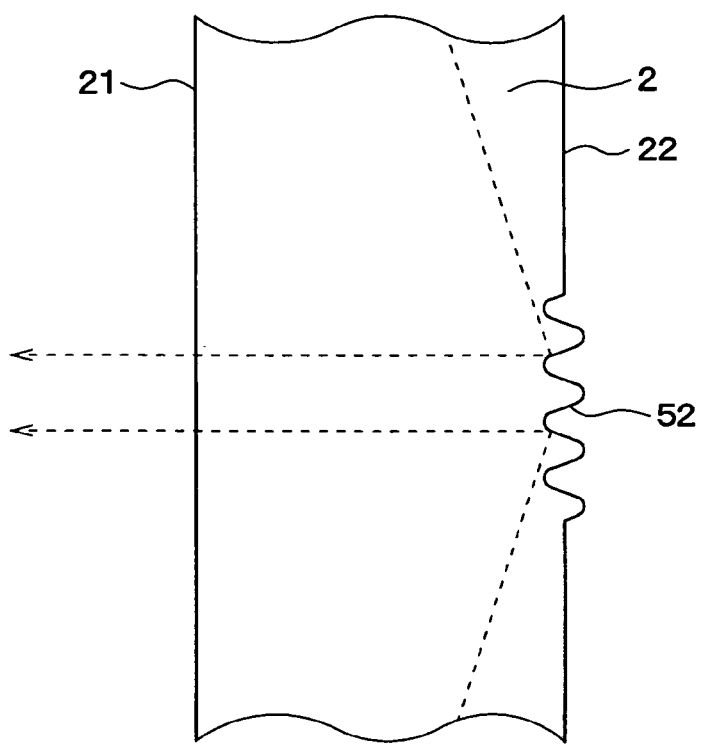
FIG. 14 is a cross-sectional view showing part of the rotatable pointer disc as Example 7-1 of the present invention.
Figure 15:
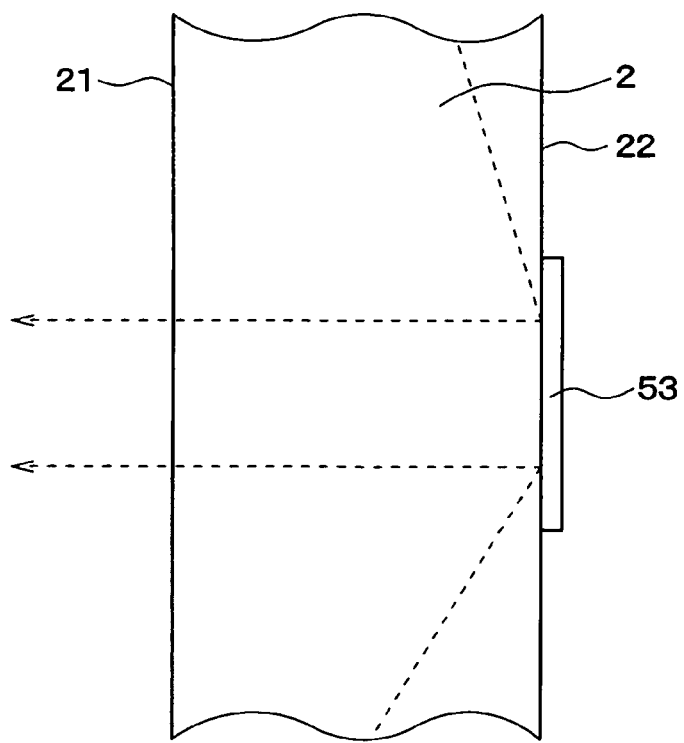
FIG. 15 is a cross-sectional view showing part of the rotatable pointer disc as Example 7-2 of the present invention.

Example 7-1 is shown in FIG. 14. In this example, a rough surface 52 is formed on the rear surface 22 of the pointer disc 2 instead of forming the V-shaped groove 11. The light in the disc portion 2b is reflected toward the front side by the rough surface 52 as shown with dotted lines in FIG. 14. By forming additional rough surfaces on the rear surface 22, an ornamental pattern may be made on the front surface of the dial plate 1 using light reflected by the covering boss 14 as explained in the description of Example 1. Example 7-2 is shown in FIG. 15. In this example, a transparent colored layer 53 is formed on the rear surface 22 of the pointer disc 2 in place of the V-shaped groove 11. The light traveling in the disc portion 2b of the pointer disc 2 is reflected toward the front side as shown with dotted lines in FIG. 15. It is also possible to make the transparent colored layer 53 non-transparent. In this case, too, the pointer disc 2 can be overlapped on the dial plate 1 without blinding the numerals 1a and scales 1b on the dial plate 1 because the pointer disc 2 except the colored layer 53 is transparent. As exemplified above, the first reflecting means can be made in various forms, such as the V-shaped groove 11, the concave circular groove 51, the rough surface 52, or the colored layer 53, as long as the light traveling in the pointer disc 2 is reflected toward the front side.

Figure 16A:
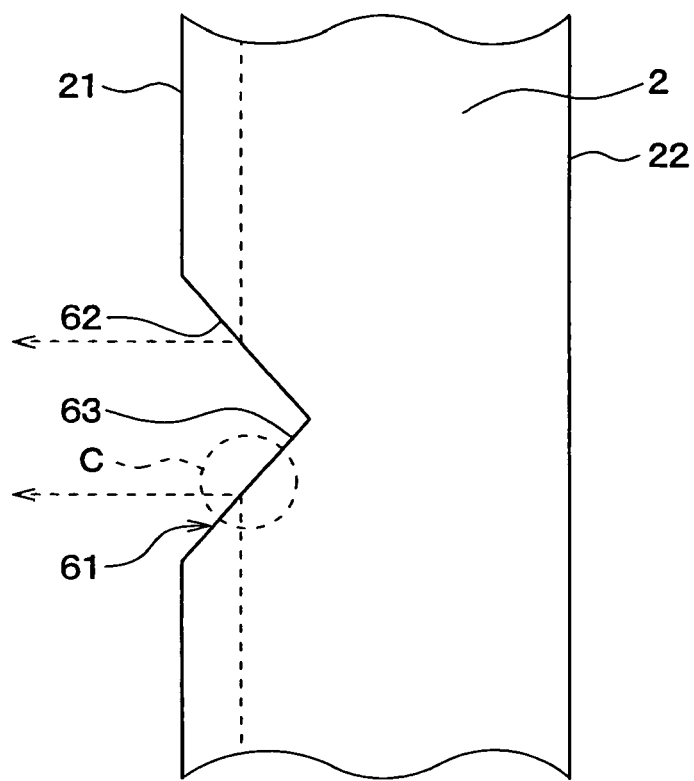
FIG. 16A is a cross-sectional view showing part of the rotatable pointer disc as Example 8-1 of the present invention.
Figure 16B:
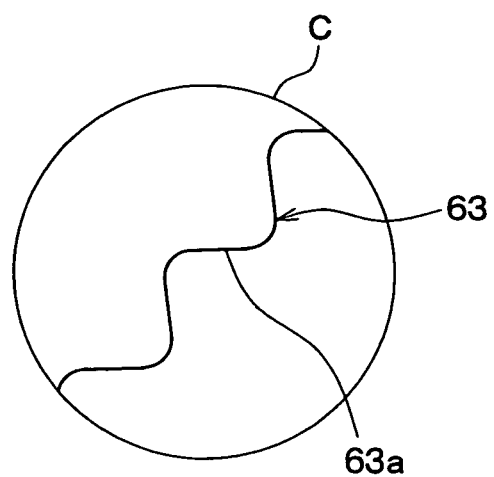
FIG. 16B is a cross-sectional view showing a portion C encircled in FIG. 16A.

Example 8-1 is shown in FIGS. 16A and 16B. In this example, a groove 61 (the first reflecting means) having groove surfaces 62, 63 is formed on the front surface 21 of the pointer disc 2 (not on the rear surface 22). The shape of the groove 61 is the same as that of the groove 11 in Example 1. That is, an angle between both groove surfaces 62, 63 is 90°. The groove surfaces 62, 63 are processed to be rough surfaces 63a (as shown in FIG. 16B) having small projections and depressions. The light traveling in the disc portion 2b of the pointer disc 2 is reflected toward the front side, as shown with dotted lines in FIG. 16A, thereby making the pointer portion 15 visible. The light reflected on the groove surfaces 62, 63 is scattered due to their roughness. It is possible to form the groove surfaces 62, 63 without making roughness. In place of the groove 61, only a rough surface may be formed on the front surface 21 of the pointer disc 2.

Figure 17:
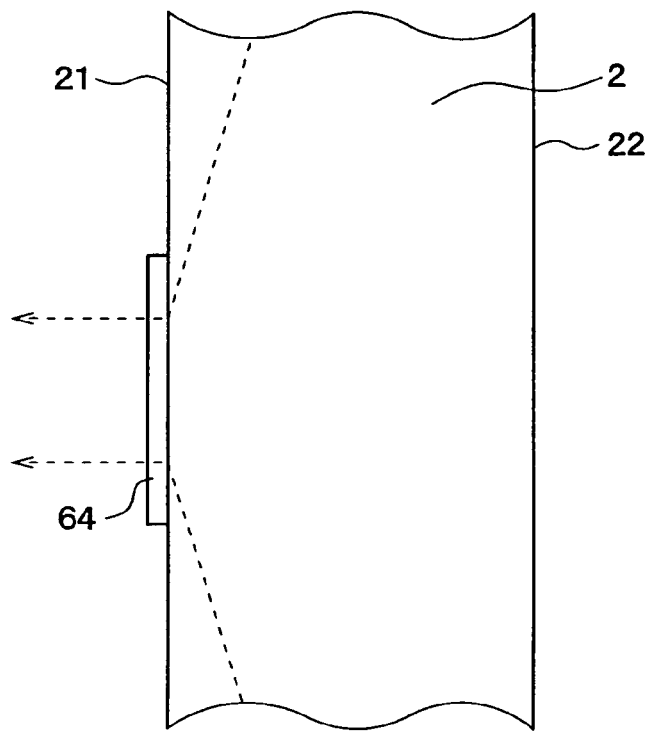
FIG. 17 is a cross-sectional view showing part of the rotatable pointer disc as Example 8-2 of the present invention.

Example 8-2 is shown in FIG. 17. In this example, a transparent colored layer 64 is formed on the front surface 21 of the pointer disc 2. The transparent colored layer 64 may be formed by printing, hot stamping, painting or the like. The light traveling in the disc portion 2b of the pointer disc 2 is reflected by the transparent colored layer 64 as shown with dotted lines in FIG. 17.

Figure 18:
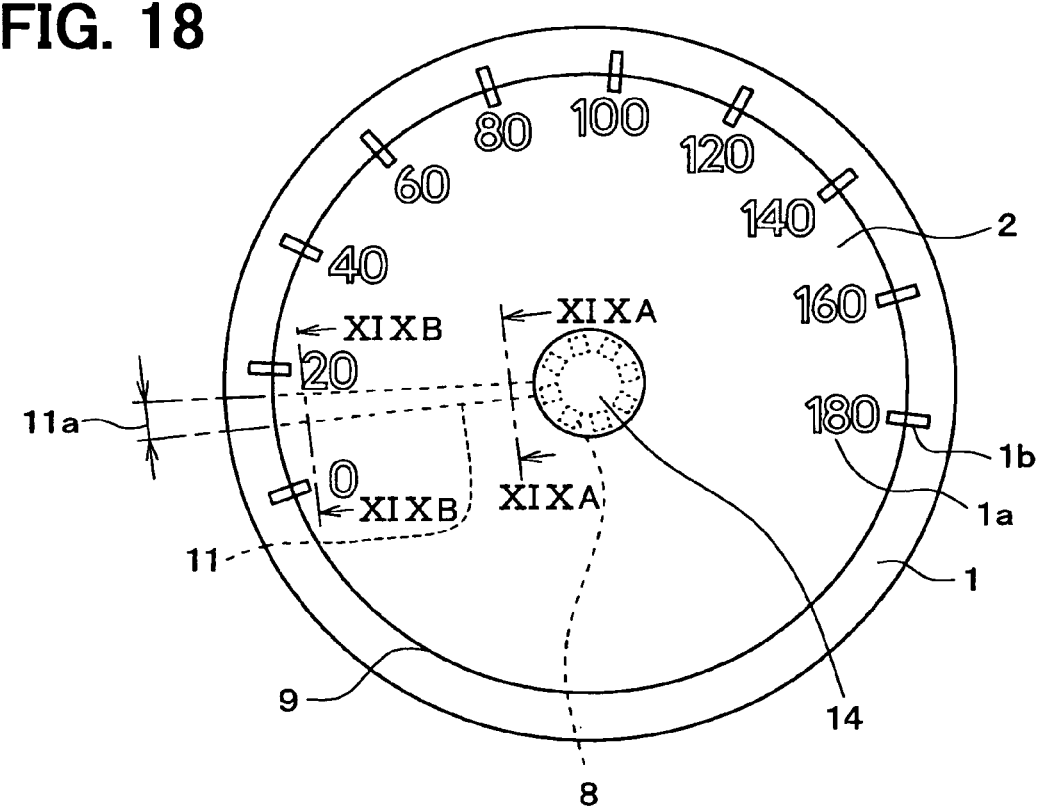
FIG. 18 is a front view showing a meter panel as Example 9-1 of the present invention.
Figure 19A:
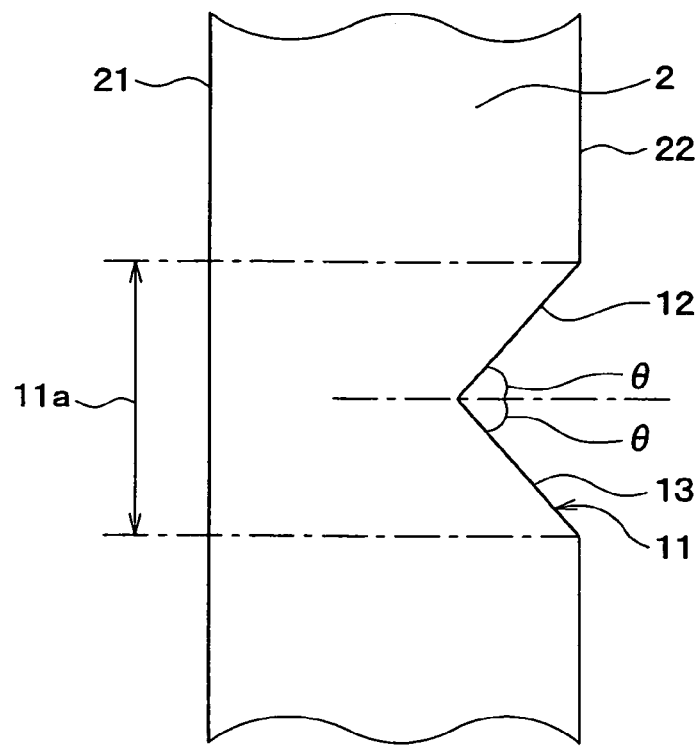
FIG. 19A is a cross-sectional view showing part of the rotatable pointer disc as Example 9-1 of the present invention, taken along line XIXA-XIXA shown in FIG. 18.
Figure 19B:
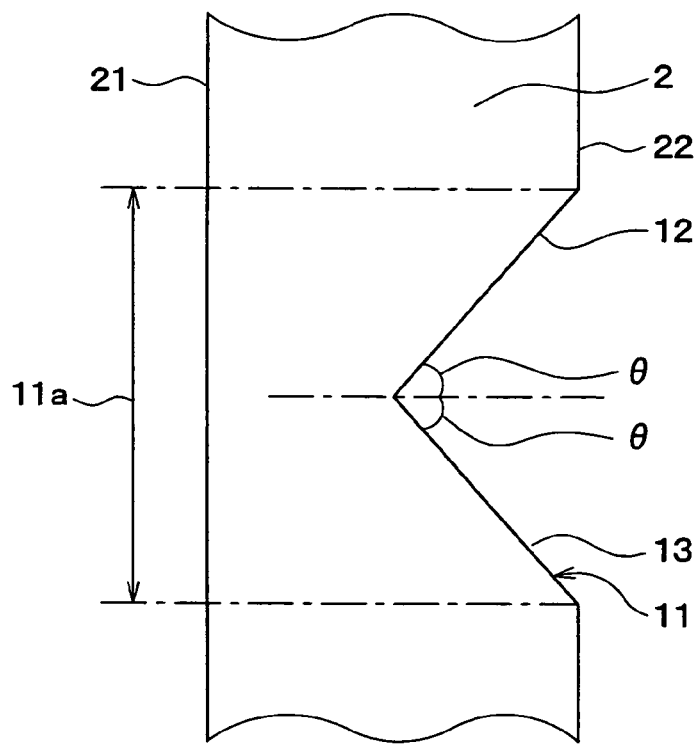
FIG. 19B is a cross-sectional view showing part of the rotatable pointer disc as Example 9-1 of the present invention, taken along line XIXB-XIXB shown in FIG. 18.
Figure 20:
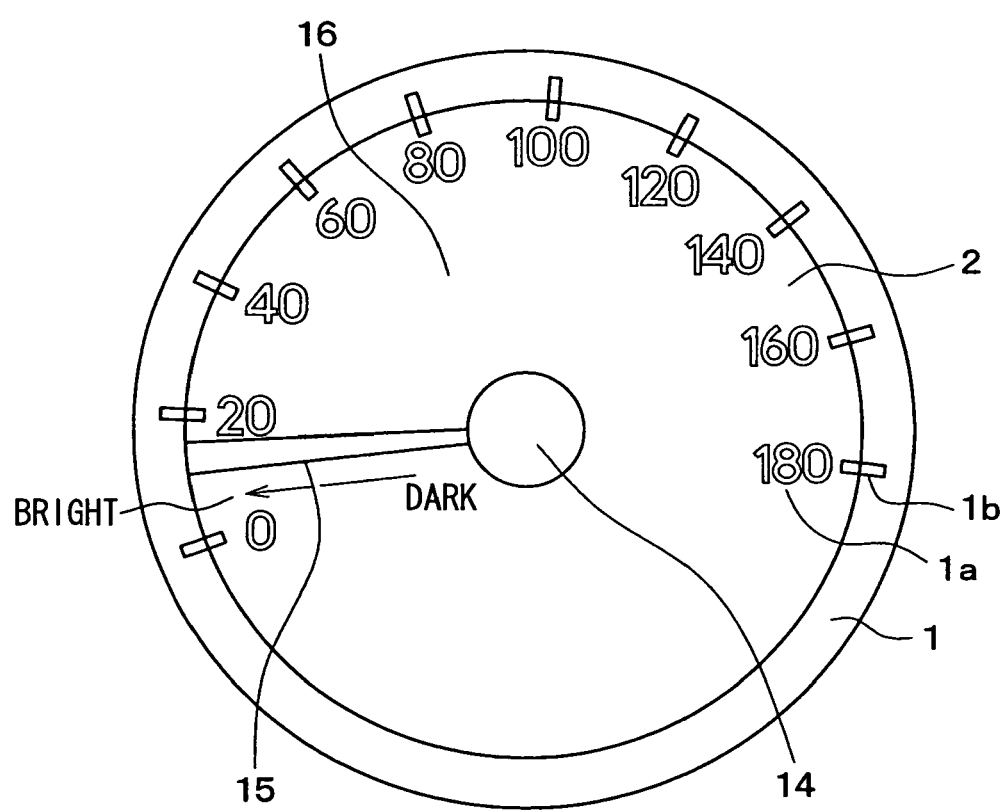
FIG. 20 is a front view showing a meter panel as Example 9-1 of the present invention.

Example 9-1 is shown in FIGS. 18, 19A, 19B and 20. In this example, the width 11a of the groove 11 is made to gradually increase along the radial direction from the inside to the outside as shown in FIGS. 18 and 20. Other structures are the same as those in Example 1. The groove 11 is V-shaped as in Example 1. A cross-section of the V-shaped groove 11 at the inside portion is shown in FIG. 19A, while its cross-section at the outside portion is shown in FIG. 19B. As seen in FIGS. 19A and 19B, the shape of the groove 11 is the same throughout its entire length. That is, the angle $2\times\theta$ between groove surfaces 12, 13 is constant, e.g., 90°, throughout the entire length. However, the width 11a and the depth are gradually increased along the radial direction from the inside to the outside of the pointer disc 2. As the groove 11 becomes larger, an amount of light reflected by the groove becomes higher. Accordingly, the pointer portion 15 becomes brighter gradually as it proceeds from the inside to the outside, as shown in FIG. 20.

Figure 21A:
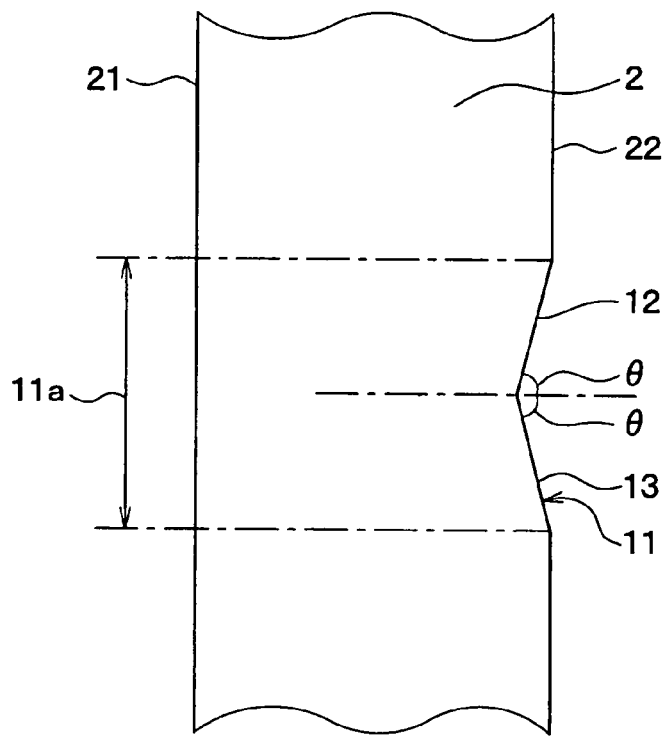
FIG. 21A is a cross-sectional view showing part of the rotatable pointer disc as Example 9-2 of the present invention, taken along line XXIA-XXIA shown in FIG. 1.
Figure 21B:
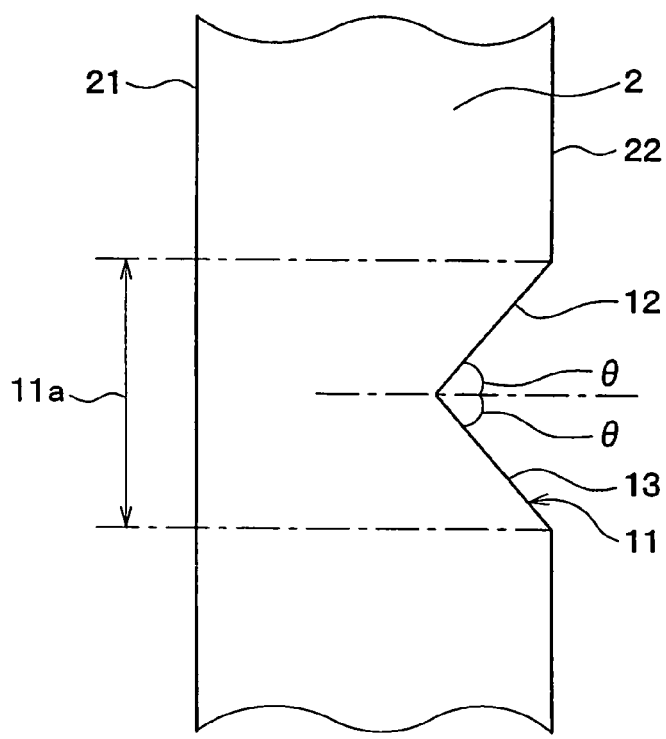
FIG. 21B is a cross-sectional view showing part of the rotatable pointer disc as Example 9-2 of the present invention, taken along line XXIB-XXIB shown in FIG. 1.

Example 9-2 is shown in FIGS. 21A and 21B. In this example, the groove 11 formed on the rear surface 22 of the pointer disc 2 is modified, and other structures are the same as those of Example 1. The width 11a of the groove 11 is kept constant throughout its entire length, but the angle $2\times\theta$ between groove surfaces 11, 12 is made to gradually change along the radial direction. That is, the angle $\theta$ at the inside portion is larger, and the depth is shallower, as shown in FIG. 21A. The angle $\theta$ at the outside portion is smaller and the depth is deeper. As the groove 11 becomes deeper, an amount of light reflected by the groove 11 becomes larger. Accordingly, the pointer portion 15 gradually becomes brighter as it proceeds from the inside to the outside. It is preferable to set the angle $\theta$ to 45° at the outside portion.

Displaying the pointer portion 15 with different brightness realized in Examples 9-1 and 9-2 can be realized also in Example 7-1 shown in FIG. 14 and Example 7-2 shown in FIG. 15. In the form of Example 7-1, roughness of the rough surface 52 can be gradually changed along the radial direction of the pointer portion. That is, the rough surface 52 is made rougher to have larger projections and depressions at the outside. In this manner, the outside looks brighter than the inside.

In the form of Example 7-2, when the transparent colored layer 53 is printed with a single colored ink throughout its entire length, the width of the transparent layer 53 is made wider at the outside compared with the inside to illuminate the outside brighter than the inside. When the transparent colored layer 53 is formed by printing with white dots, the dots are made denser at the outside than the inside to make the outside brighter. If the colored layer 53 is formed by printing dots made of a light-absorbing material, dot density is reversed, i.e., the density is made denser at the inside than at the outside. Alternatively, the colored layer 53 may be printed with inks absorbing lights of different wavelengths to illuminate the pointer portion 15 with gradually changing colors along the radial direction, i.e., with a brighter color at the outside than at the inside.

Changing gradually the brightness of the pointer portion 15 may be realized, in the similar manner described above, also in the form of Example 8-1 shown in FIGS. 16A, 16B and in the form of Example 8-2 shown in FIG. 17, in which the groove 61 or the transparent colored layer 64 is formed on the front surface 21 of the pointer disc 2.

Though the brightness of the pointer portion 15 is made to gradually change along its radial direction in the Examples 9-1 and 9-2 and others, it is also possible to abruptly change the brightness or colors at a certain point or points of the pointer portion 15. Alternatively, it is also possible to make the pointer illumination brighter at the inside and darker at the outside if such is required for some reasons.

Figure 22:
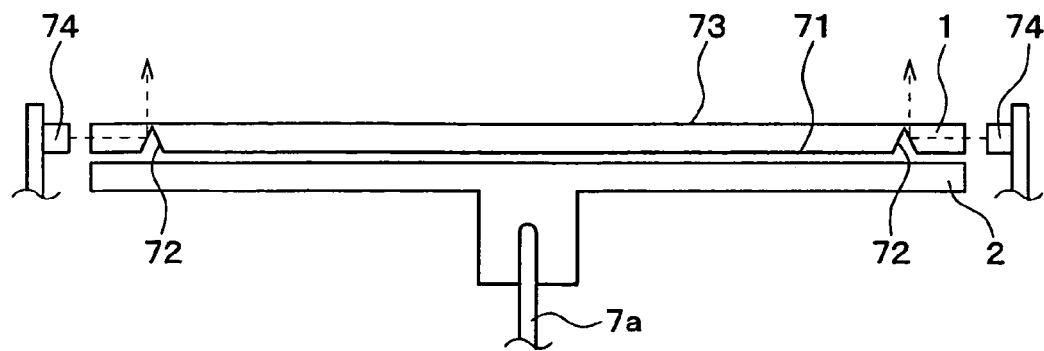
FIG. 22 is a cross-sectional view showing part of a meter panel as Example 10 of the present invention.

Example 10 is shown in FIG. 22. In this example, the positions of the dial plate 1 and the pointer disc 2 are reversed. That is, the dial plate 1 is disposed in front of the rotatable pointer disc 2. The dial plate 1 is made of a transparent material such as acrylic resin, and grooves or rough surfaces 72 are formed on the rear surface of the dial plate 1. Light sources 74 are positioned to face the outer periphery of the dial plate 1. Light introduced into the dial plate 1 is reflected at the grooves or the rough surfaces 72 to thereby show scales and numerals on the dial plate 1. In place of the grooves or the rough surfaces 72, transparent colored layers may be made. Alternatively, the colored layers may be printed with non-transparent ink. In this case, however, light sources for illuminating the non-transparent colored layers has to be provided.

Figure 23:
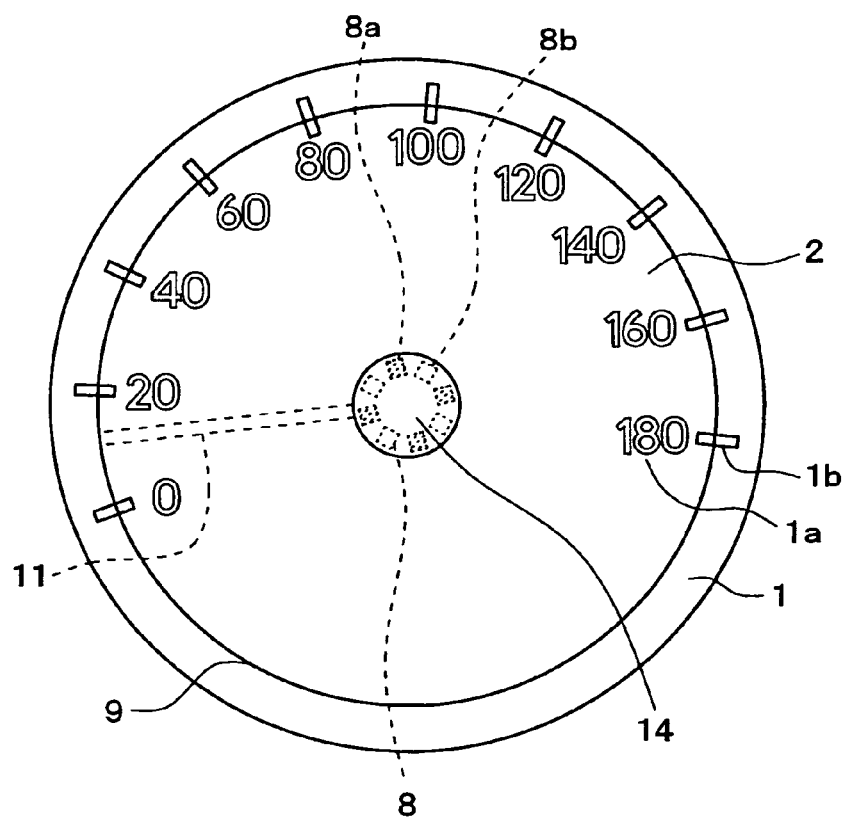
FIG. 23 is a front view showing a meter panel as Example 11 of the present invention.
Figure 24:
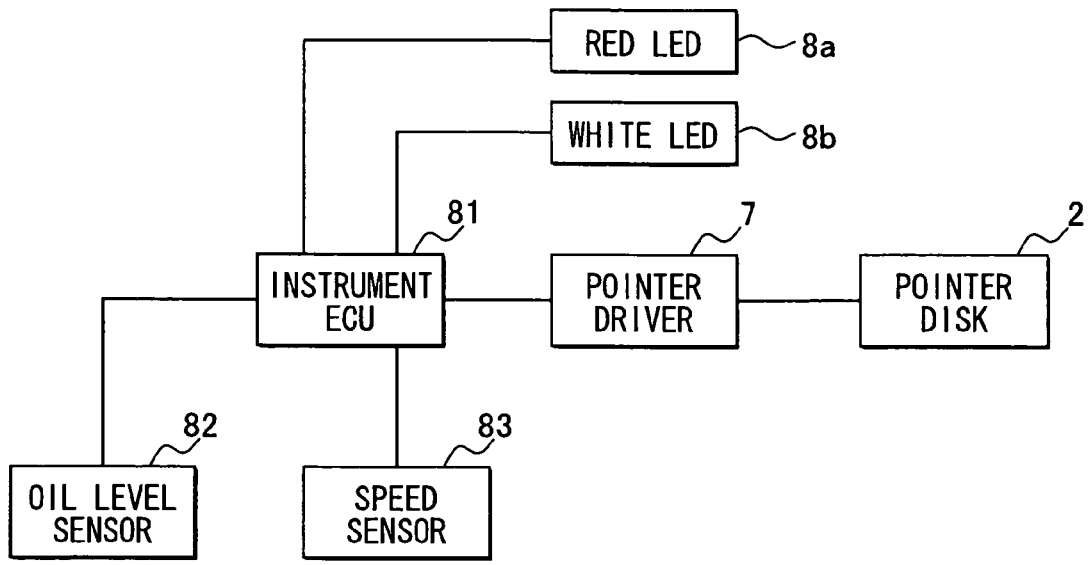
FIG. 24 is a block diagram showing a structure of a meter device as Example 11 of the present invention.

Example 11 is shown in FIGS. 23 and 24. In this example, the light sources 8 for illuminating the groove 11 (the pointer portion 15) are composed of red LEDs (light emitting diodes) 8a and white LEDs 8b, both positioned alternately as shown in FIG. 23. The LEDs 8a, 8b are controlled by an instrument ECU (electronic control unit) 81, which maybe referred to as control means, in the manner described below.

As shown in FIG. 24, signals are fed to the instrument ECU 81 from an oil level sensor 82 and a speed sensor 83. The pointer disc 2 is driven by the pointer driver 7 which is controlled by the instrument ECU 81. When the vehicle speed is lower than 100 km/h, for example, only the white LEDs 8b are lit. When the vehicle speed exceeds 100 km/h, the white LEDs 8b are turned off and the red LEDs 8a are lit. When the vehicle speed becomes again lower than 100 km/h, the red LEDs 81a are turned off, and the white LEDs 81b are lit.

In a conventional pointer disc having a slit for showing a pointer, light sources having different colors have to be positioned at respective speed regions in order to illuminate the pointer with different colors according to the vehicle speed. In contrast, all the light sources 8 in different colors can be positioned at the center portion in this example, simplifying the meter structure. It is also possible to change the illumination colors of the pointer portion 15 according to speed limits of the road by employing the structure of Example 11.

It is also possible to change the illumination colors according to signals from the oil level sensor 82, for example. The illumination colors may be changed from white to red when the warning signal is fed to the instrument ECU 81 to draw a driver's attention. Alternatively, both of the red LEDs 8a and the white LEDs 8b may be lit at the same time, and the respective light intensities may be controlled according to the vehicle speed. By changing the light intensities, the illumination colors can be changed. It is also possible to use three colors, red, green and blue as the colors of the light sources 8. In this case, the pointer portion 15 can be illuminated in arbitrary colors. In stead of using the light sources 8 having different colors, it is also possible to use a light source, the color of which is changeable according to user's preference, for example.

Figure 25:
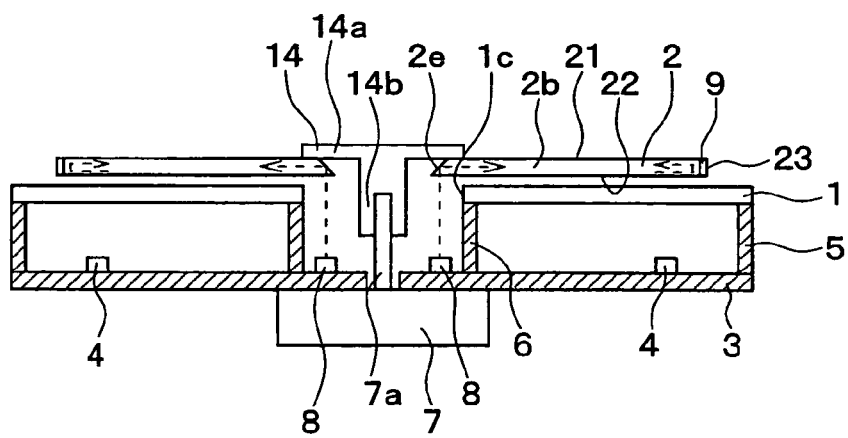
FIG. 25 is a cross-sectional view showing a meter panel as Example 12-1 of the present invention, taken along line II-II shown in FIG. 1.

Example 12-1 is shown in FIG. 25. In this example, the center portion 2a of the pointer disc 2 shown in FIG. 2 is eliminated. Instead, a reflecting surface 2e is formed at a center opening of the pointer disc 2. Light emitted from the light sources 8 is reflected at the reflecting surface 2e and introduced into the disc portion 2b of the pointer disc 2. The covering boss 14 is modified to have a flat portion 14a and a projected portion 14b. The projected portion 14b is connected to the shaft 7a of the pointer driver 7. Other structures are the same as those of Example 1. Since the pointer disc 2 has no center portion 2a in this example, the pointer disc 2 can be easily manufactured by stamping, for example.

Figure 26:
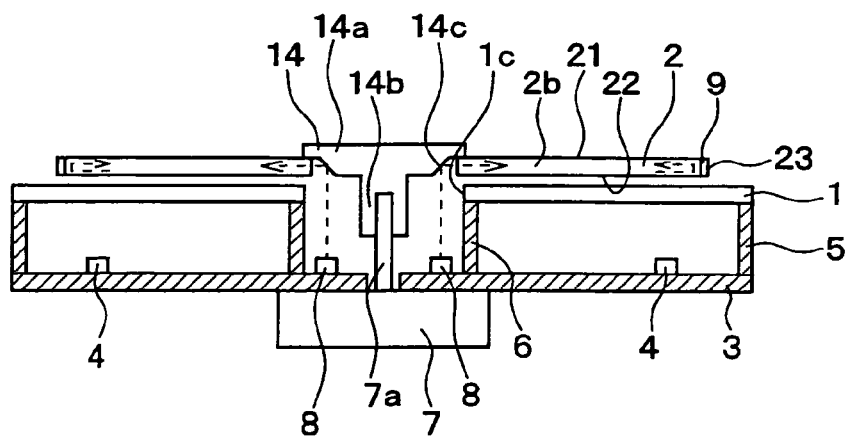
FIG. 26 is a cross-sectional view showing a meter panel as Example 12-2 of the present invention, taken along line II-II shown in FIG. 1.

Example 12-2 is shown in FIG. 26. In this example, the covering boss 14 used in Example 12-1 is modified to have a reflecting surface 14c, and the reflecting surface 2e formed in Example 12-1 is eliminated. The reflecting surface 14c may be formed by plating. Light emitted from the light sources 8 is reflected by the reflecting surface 14c and introduced into the pointer disc 2. Other structures are the same as those in Example 12-1.

Figure 27:
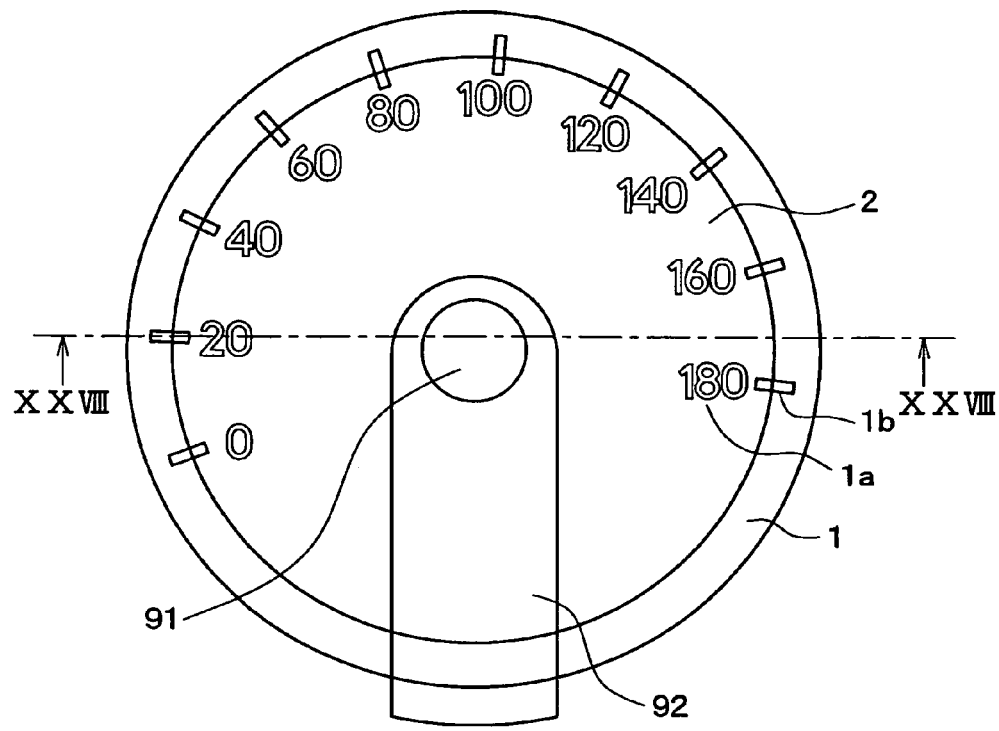
FIG. 27 is a front view showing a meter panel as Example 13-1 of the present invention.
Figure 28:
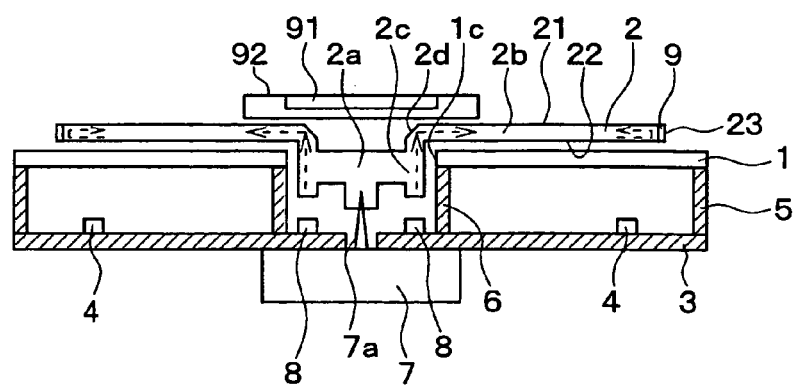
FIG. 28 is a cross-sectional view showing the meter panel as Example 13-1 of the present invention, taken along line XXVIII-XXVIII shown in FIG. 27.
Figure 29:
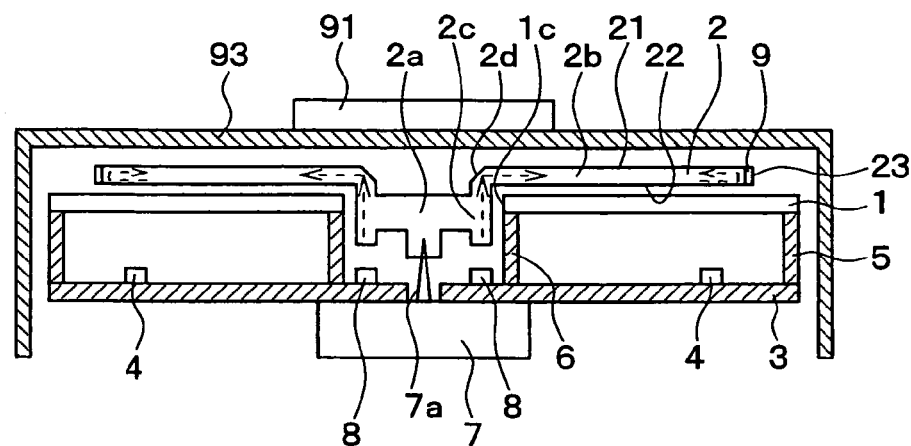
FIG. 29 is a cross-sectional view showing a meter panel as Example 13-2 of the present invention.

Example 13-1 is shown in FIGS. 27 and 28. In this example, the covering boss 14 shown in FIG. 2 is modified to a holder 92 that covers the center portion 2a of the pointer disc 2 and holds a multi-purpose display panel 91 (such as a liquid crystal display panel) thereon. The holder 92 is supported on a structure (not shown) positioned outside of the meter panel. The holder 92 may be made of either a transparent material or a non-transparent material. Example 13-2 is shown in FIG. 29. In this example, the multi-display panel 91 is mounted on a transparent holder 93 covering an entire front surface of the pointer disc 2. Other structures are the same as those in Example 13-1.

Figure 30:
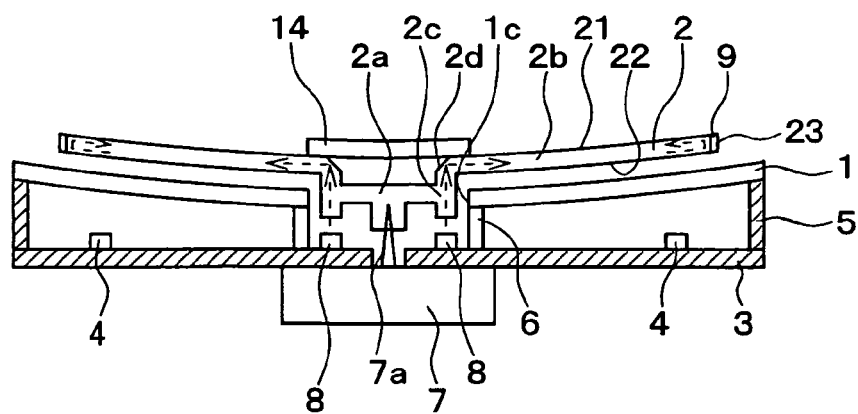
FIG. 30 is a cross-sectional view showing a meter panel as Example 14 of the present invention, taken along line II-II shown in FIG. 1.

Example 14 is shown in FIG. 30. In this example, the pointer disc 2 and the dial plate 1 are curved to form concave surfaces toward the front side. In Example 1, the front surface of the pointer disc 2 is coated with a non-reflection coating to prevent reflection from the front surface, as described above. In this example, the coating is eliminated, and instead, the pointer disc 2 and the dial plate 1 are curved. Other structures of this example is the same as those in Example 1.

The present invention is not limited to the examples described above, but it may be variously modified. For example, though the coating 9 (second reflecting means) is positioned at the outer periphery 23 of the pointer disc 2 in Example 1, the position of the coating 9 may be changed according to a position of a tip of the pointer portion 15 as long as the position is close to the outer periphery 23. Though the light sources 8 are positioned to face the outer periphery 23 of the pointer disc 2 in Example 2, the light sources 8 may be positioned at other places close to the outer periphery 23.

Though the light emitted from the light sources 8 is conducted through the light-conducting portion 2c and reflected at the reflecting surface 2d in Example 1, the light sources 8 may be positioned at the place where the reflecting surface 2d is located, and the light from the light sources 8 may be directly conducted into the disc portion 2b. The positions of the light sources 8 in Example 2 may be changed so that the light is directly conducted into the disc portion 2b from the outer periphery 23.

Though the covering boss 14 in Example 1 and Example 2 are made of a non-transparent material reflecting light, the covering boss 14 and the mask 31 (used in Example 2) may be made of a non-transparent material that does not reflect light. The rear surface of the covering boss 14 and the mask 31 may be covered with a non-transparent black layer or paint. In addition to the numerals 1a and the scales 1b, other illustrations or designs may be formed on the front surface of the dial plate 1. The present invention may be applied to various devices other than the automotive speedometer, such as instruments for aircrafts and vessels or a front panel of a clock.

While the present invention has been has been shown and described with reference to the foregoing preferred embodiment, it will be apparent to those skilled in the art that changes in form and detail may be made therein without departing from the scope of the invention as defined in the appended claims.

What is claimed is:

1. A meter panel for use in an instrument panel, comprising:
   a dial plate showing scales and numerals thereon;
   a rotatable pointer disc, made of a light-conductive transparent material, disposed in parallel to the dial plate to overlap the dial plate, the rotatable pointer disc having a pointer portion and an outer periphery including a light-reflecting portion;
   a light source for emitting light into the rotatable pointer disc, the light source being disposed at a position closer to a rotational center than to the outer periphery of the rotatable pointer disc; and
   means for directing the light emitted into the rotatable pointer disc to the light-reflecting portion of the outer periphery and for directing the light reflected by the light-reflecting portion toward a front side of the meter panel to make the pointer portion visible.

2. The meter panel as in claim 1, wherein:

an amount of light directed toward the front side of the meter panel is varied along a radial direction of the pointer portion.

3. The meter panel as in claim 2, wherein:

the amount of light directed toward the front side of the meter panel is the smallest at a radial inside of the pointer portion and gradually increases toward a radial outside of the pointer portion.

4. A meter panel for use in an instrument panel, comprising:

a dial plate showing scales and numerals thereon;

a rotatable pointer disc, made of a light-conductive transparent material, disposed in front of the dial plate to overlap the dial plate, the rotatable pointer disc having a pointer portion and an outer periphery including a light-reflecting portion;

a light source for emitting light into the rotatable pointer disc, the light source being disposed at a position closer to a rotational center than to the outer periphery of the rotatable pointer disc; and means for directing the light emitted into the rotatable pointer disc to the light-reflecting portion of the outer periphery and for directing the light reflected by the light-reflecting portion toward a front side of the meter panel to make the pointer portion visible.

5. The meter panel as in claim 4, wherein:

the light source is composed of a first light source emitting light having a first color and a second light source emitting light having a second color; and the meter panel further includes means for controlling the light source so that at least either one of the first light source or the second light source is turned on.

6. The meter panel as in claim 5, wherein:

the controlling means controls the light source so that either one of the first light source or the second light source is exclusively turned on at a given time.

7. The meter panel as in claim 5, wherein:

the controlling means controls the light source so that both of the first light source and the second light source are simultaneously turned on, and light intensities of both light sources are changed.

8. A meter panel for use in an instrument panel, comprising:

a dial plate showing scales and numerals thereon;

a rotatable pointer disc, made of a light-conductive transparent material, disposed in front of the dial plate to overlap the dial plate, the rotatable pointer disc having a pointer portion and an outer periphery including a light-reflecting portion;

a light source for emitting light into the rotatable pointer disc, the light source being disposed at a position closer to a rotational center than to the outer periphery of the rotatable pointer disc; and means for directing the light emitted into the rotatable pointer disc to the light-reflecting portion of the outer periphery and for directing the light reflected by the light-reflecting portion toward a front side of the meter panel to make the pointer portion visible, the light directing means being formed on the rear surface of the rotatable pointer disc.

9. The meter panel as in claim 8, wherein:

the light directing means is a groove.

10. The meter panel as in claim 9, wherein:

the groove is composed of a pair of surfaces forming a V-shape; and each surface is a rough surface having small projections and depressions.

11. The meter panel as in claim 10, wherein:

an angle made between the pair of surfaces forming the V-shaped groove is constant throughout an entire length of the groove; and the depth of the groove is varied along the radial direction of the groove.

12. The meter panel as in claim 11, wherein:

the depth of the V-shaped groove is the smallest at a radial inside of the pointer portion and gradually increases toward a radial outside of the pointer portion.

13. The meter panel as in claim 9, wherein:

the groove is a concave circular groove.

14. The meter panel as in claim 8, wherein:

an amount of light directed toward the front side of the meter panel is varied along a radial direction of the pointer portion.

15. The meter panel as in claim 14, wherein:

the amount of light directed toward the front side of the meter panel is the smallest at a radial inside of the pointer portion and gradually increases toward a radial outside of the pointer portion.

16. The meter panel as in claim 8, wherein: the light-reflecting portion is a coating.

17. The meter panel as in claim 8, further including means for covering the position where the light is introduced into the portable pointer disc to prevent the light from being emitted toward the front side of the meter panel.

18. The meter panel as in claim 17, wherein:

he covering means reflects the light toward the dial plate.

19. The meter panel as in claim 8, wherein the light source is positioned close to the rotational center of the rotatable pointer disc.

20. The meter panel as in claim 19, wherein the light source is composed of a plurality of light sources.

21. The meter panel as in claim 19, wherein the light directing means is a groove formed on a rear surface of the rotatable pointer disc.

22. A meter panel for use in an instrument panel, comprising:

a dial plate showing scales and numerals thereon;

a rotatable pointer disc, made of a light-conductive transparent material, disposed in front of the dial plate to overlap the dial plate, the rotatable pointer disc having a pointer portion;

a plurality of light sources for emitting light into the rotatable pointer disc, the light sources being disposed to emit light into the rotatable pointer disc from an outer periphery thereof; and means for directing the light emitted into the rotatable pointer disc from the light sources toward a front side of the meter panel to make the pointer portion visible, wherein the light emitted from the plurality of light sources travels through an inside of the rotatable pointer disc, the rotatable pointer disc includes a light-reflecting portion formed at its center portion, and light that travels from the outer periphery of the rotatable pointer disc through its inside to reach the light-reflecting portion is reflected on the light-reflecting portion and led to the light-directing means.

23. The meter panel as in claim 22, wherein the plurality of light sources are positioned to surround the outer periphery of the rotatable pointer disc.

* * * * *